No. 715,575. Patented Dec. 9, 1902.
F. G. HAMPSON.
AERATION OF LIQUIDS.
(Application filed Oct. 21, 1901.)
(No Model.) 6 Sheets—Sheet 1.

Fig. 1.

No. 715,575. Patented Dec. 9, 1902.
F. G. HAMPSON.
AERATION OF LIQUIDS.
(Application filed Oct. 21, 1901.)

(No Model.) 6 Sheets—Sheet 3.

Fig. 2.

Witnesses: Inventor:
Katherine E. Manning. Frank George Hampson.
Jas. C. Adams By Knight Bros
Attorney No. 715,575. Patented Dec. 9, 1902.
F. G. HAMPSON.
AERATION OF LIQUIDS.
(Application filed Oct. 21, 1901.)

(No Model.) 6 Sheets—Sheet 6.

UNITED STATES PATENT OFFICE.

FRANK GEORGE HAMPSON, OF CHELSEA, ENGLAND, ASSIGNOR OF ONE-HALF TO HARRY SWALES, OF LONDON, ENGLAND.

AERATION OF LIQUIDS.

SPECIFICATION forming part of Letters Patent No. 715,575, dated December 9, 1902.

Application filed October 21, 1901. Serial No. 79,457. (No model.)

*To all whom it may concern:*

Be it known that I, FRANK GEORGE HAMPSON, a subject of the King of England, residing at Chelsea, Middlesex, England, have invented certain new and useful Improvements in or Relating to the Aeration of Liquids, (for which I have made application for Letters Patent in Great Britain, under No. 19,326, dated September 27, 1901,) of which the following is a specification.

This invention relates to the aeration of liquids, and has for its chief object to provide an apparatus in which the water to be aerated is supplied direct from the service-main or any other continuous source of supply, the gas being preferably supplied under pressure from bottles or other convenient sources.

According to this invention the apparatus comprises, essentially, a filling-bottle communicating with separate supplies of gas and water, a reservoir or aerating-chamber into which the gas and liquid are admitted from the filling-bottle and aerated, a delivery vessel communicating with the aerating-chamber and from which the aerated product is delivered, preferably after the reduction of pressure, and suitable valve-controlling mechanism for the various parts.

An important feature of the apparatus is that the withdrawal of a quantity of aerated liquid therefrom does not materially reduce the quantity of aerated liquid in the aerating-chamber, so that provided the various valves are properly regulated and operated a constant supply of aerated liquid from the apparatus can be obtained.

Referring to the drawings.

Like letters indicate like parts throughout the drawings.

A is the filling-bottle, B the aerating-chamber, and C the delivery vessel.

Figure 1:
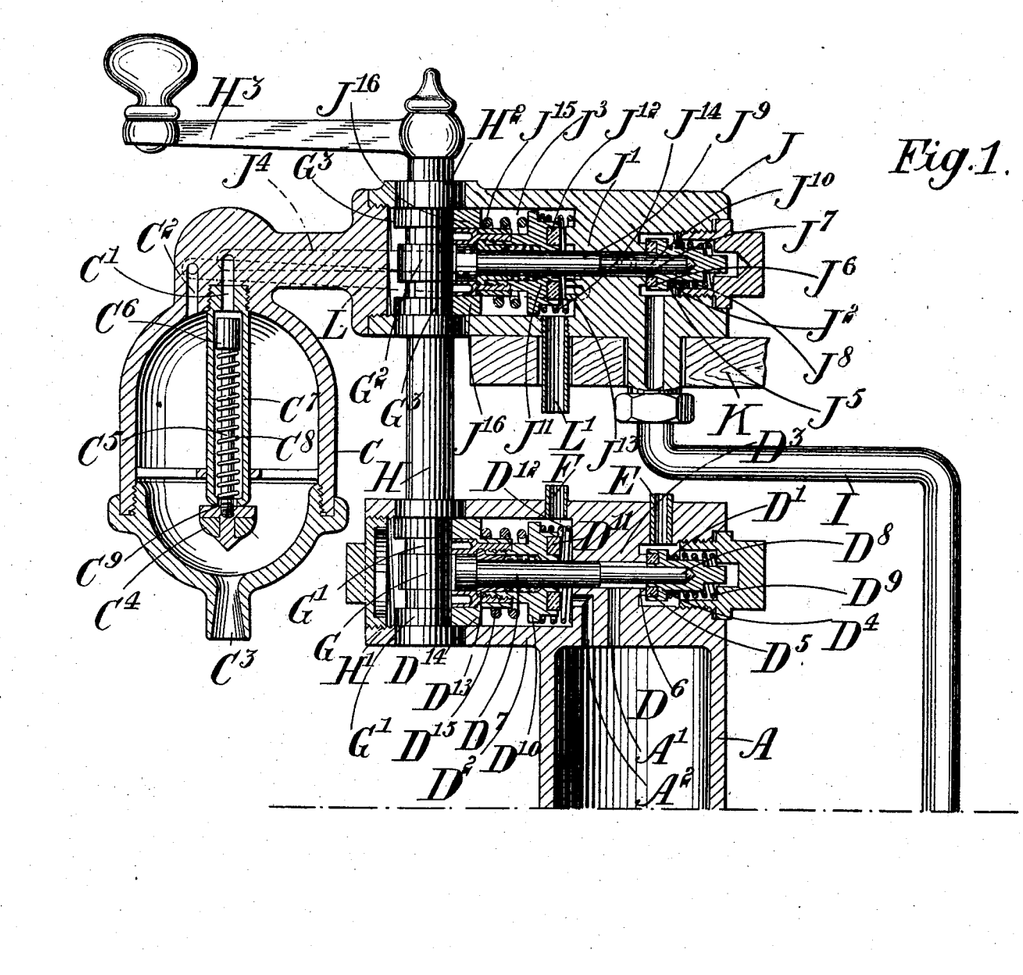
Figure 1 is a sectional elevation of a convenient form of apparatus constructed in accordance with this invention.
Figure 2:
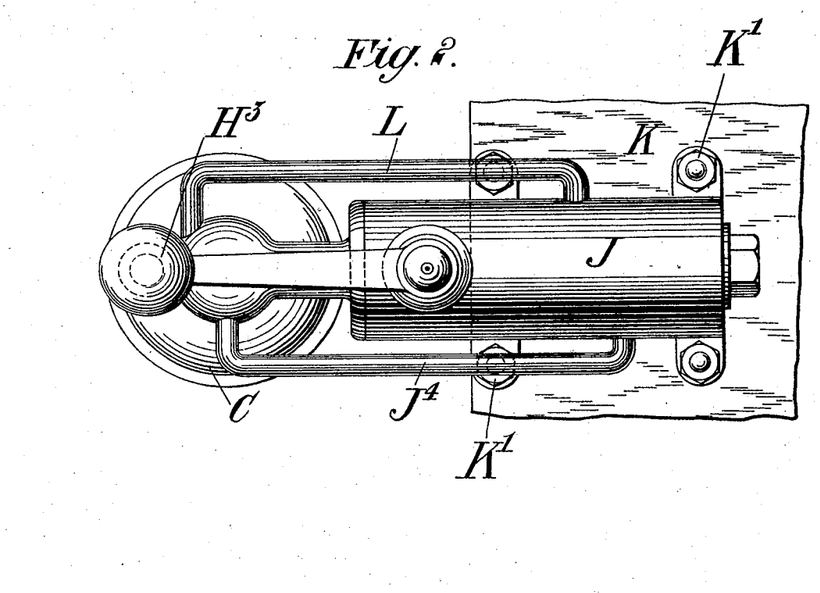
Fig. 2 is a plan of Fig. 1.

Referring more particularly to Fig. 1, on the top or upper end of the filling-bottle A is provided a valve-casing D, formed integral with the cover of the filling-bottle or of a separate piece connected to the filling-bottle by any suitable means. The valve-chamber is divided by a diaphragm or partition $D^3$ into two compartments $D'$ $D^2$, the chamber $D'$ being in communication with the gas-supply through a pipe E and with the filling-bottle through a conduit $A'$, while the chamber $D^2$ communicates with the filling-bottle through a conduit $A^2$ and with the atmosphere through a pipe F. A piston-valve $D^4$, having rubber or other face $D^5$, slides in the chamber $D'$ and is normally kept against its seat by a spring $D^9$ to prevent the gas entering the bottle till required. The piston of the valve is hollowed to receive the end of a spindle $D^7$, which slides in an opening in the diaphragm $D^3$ and is reduced at $D^8$ to allow the gas to pass between it and the walls of the opening in the diaphragm. In the chamber $D^2$ is disposed a similar piston-valve $D^{10}$, having a rubber face $D^{11}$ and adapted to control the escape of the gas from the filling-bottle A. The valve is normally kept off its seat by a spring $D^{12}$, and the spindle $D^7$ passes through a stuffing-gland $D^{13}$ in the valve $D^{10}$, the outer end of the spindle being adapted to be acted upon by a cam G, operated in the manner hereinafter described. Between the piston-valve $D^{10}$ and its operating-cam $G'$ is placed a sliding collar or piston $D^{14}$, which is pressed toward the cam by a spring $D^{15}$, adapted to take up any wear in the valve and insure it being fluid-tight when pressed against its seat. The cams G G' are carried by a spindle H, mounted in the valve-casing and provided with bearing-surfaces $H'$. The water to be aerated enters the filling-bottle from the supply-pipe by an inlet-opening $A^3$, situated at the lower end of the filling-bottle and controlled by a non-return valve $A^4$. When the bottle is filled, the valve $D^4$ is opened to admit gas to the bottle, and the inrushing gas mixes with the water, the increase of pressure in the bottle being sufficient to cause the valve $A^4$ to be closed and also to force a valve $B'$ off its seat against the action of a spring $B^3$, so that the mixture of gas and water passes down a pipe $B^2$ to the lower end of the aerating-chamber B. The aerating-chamber is closed in an air-tight manner by a cover $B^4$, which preferably forms the bottom of the filling-bottle, the parts being bolted together in a suitable manner. For the purpose of causing a more intimate mixing of the gas and liquid a series of diaphragms $B^5$ are disposed within the aerating-chamber. These diaphragms are conveniently mounted on a spindle $B^6$, which may be secured to the cover $B^4$ and are held apart by distance-pieces $B^7$ or other devices. Each diaphragm is perforated at $B^8$ in such a manner that the perforations of one diaphragm are diametrically opposite to the perforations in an adjacent diaphragm, so that the gas and liquid pass upward in the chamber in a zigzag course. If desired, however, the diaphragms may be perforated over their entire surface. The aerated liquid passes by a pipe I, leading from the upper part of the aerating-chamber, to a valve-chamber J, communicating with the delivery vessel C. The valve-chamber is formed in a casting which supports the delivery vessel and which is secured to the counter, bar, or other suitable support K by bolts $K'$. The valve-chamber is divided by a diaphragm or partition $J'$ into two compartments $J^2 J^3$, and the pipe I, leading from the aerating-chamber, opens into the compartment $J^2$, the outlet of which communicates by a pipe $J^4$ with a conduit $C'$, opening into the upper part of the delivery vessel. The outlet of the compartment $J^2$ is controlled by a piston-valve $J^5$, preferably of similar construction to the gas-inlet $D^4$ on the filling-bottle, being provided with a rubber face $J^6$, which is pressed against a seat $J^7$ on the valve-casing by a spring $J^8$. The piston is hollowed to receive the end of a spindle $J^9$, which is reduced in area at $J^{10}$ to allow the liquid to pass between it and the walls of the opening in the diaphragm $J'$. In the compartment $J^3$ of the valve-chamber, which communicates with the delivery vessel by means of a pipe L opening into a conduit $C^2$ at the upper part of the delivery vessel and with the atmosphere by a pipe $L'$, is situated a valve similar in construction to the pressure-reducing valve of the filling-bottle, comprising a piston $J^{11}$, having a rubber facing $J^{12}$, adapted to be pressed against a seating $J^{13}$ in order to cut off the escape of gas or air from the vessel to the atmosphere. The valve is normally kept off its seat by a spring $J^{14}$, and any wear is taken up by a spring $J^{15}$, disposed between the valve-piston and a sliding piston $J^{16}$, against which the cam presses to operate the valve. The valve $J^5$ is operated by a cam $G^2$, adapted to press on the end of the spindle $J^9$ and force the valve off its seat, and the valve $J^{11}$ is pressed onto its seat by cams $G^3$. The cams $G^2$ and $G^3$ are carried by the spindle H, which carries the cams G and $G'$ and which passes through the valve-casing and is provided with bearing surfaces or collars $H^2$. On the upper end of the spindle H is fitted a radial arm and handle $H^3$, by means of which the spindle may be rotated to operate the valves.

The discharge vessel is preferably of the same or approximately the same capacity as the filling-bottle and is provided with an outlet $C^3$, controlled by a valve $C^4$, attached to a spindle $C^5$, provided at its upper end with a head or piston $C^6$, which slides loosely in a tube $C^7$ and between which and the end of the tube is disposed a spring $C^8$, which normally tends to keep the valve off its seat. The conduit $C'$, by which the liquid enters the vessel, opens into the tube $C^7$, which is screwed or otherwise secured to the mouth of the conduit, and the force of the inrushing liquid causes the valve to seat itself against the action of the spring, after which the liquid passes down between the piston and the walls of the tube and enters the vessel by perforations $C^9$. Under normal conditions the aerating-chamber is full of aerated liquid, which is accomplished by admitting water to the filling-bottle, after which gas is admitted to the filling-bottle, the pressure in the chamber being sufficient to open the non-return valve $B'$, through which the mixture passes to the aerating-chamber, this operation being repeated until the aerating-chamber is filled with aerated liquid. After the aerating-chamber has been filled and the filling-bottle is full of water the valves $D^4$, $D^{10}$, $J^5$, and $J^{11}$ are closed, in which state the apparatus may remain for any reasonable length of time. When it is desired to withdraw a quantity of aerated liquid, the handle $H^3$ is operated to rotate the spindle through a quarter of a turn, so that the gas-inlet valve $D^4$ of the filling-bottle is opened by its respective cam, and simultaneously therewith the valve $J^5$, controlling the supply of the aerated liquid to the delivery vessel, is operated by its corresponding cam. The increase in pressure in the chamber supplies the necessary force to open the valve $B'$, and the mixture of gas and liquid enter the aerating-chamber by the pipe $B^2$. This increase of pressure in the aerating-chamber forces part of the aerated liquid already therein along the pipe I and into the delivery vessel, the outlet-valve of which is forced onto its seat by the inrushing liquid, as above stated. While the delivery vessel is being filled, the valve-operating mechanism is retained stationary, the filling of the vessel being noted by the audible inrush of the liquid or by an indicator or sight-window on the vessel. When the vessel is filled, the spindle is moved through a second quarter-turn, in which position the valves $D^4$ and $J^5$ are again closed, and a further rotation of the spindle through another quarter-turn simultaneously opens the pressure-reducing valves $D^{10}$ and $J^{11}$ of the filling-bottle and delivery vessel, respectively, as shown in Fig. 1. The consequent reduction of pressure within the discharge vessel causes the outlet-valve $C^3$ to open under the action of its spring $C^8$ and the aerated product to be delivered, and the escape of gas from the filling-bottle reduces the pressure therein to normal or atmospheric level, so that the water-pressure in the main or supply pipe forces the valve $A^4$ from its seat to admit a fresh supply of water to the filling-bottle. By turning the spindle through another quarter-revolution the cycle of operations is completed and the apparatus restored to its normal conditions.

Instead of operating the valves $D^4$ $D^{10}$ $J^5$ $J^{11}$ by rotating a spindle through an entire revolution, as above stated, the valves may be operated by cams connected by levers or rods with a crank-lever or "draw-arm" arranged to operate the valves in the desired succession, or the valves may be operated by a push knob or button or by other convenient mechanism and may be of a rotary or other type instead of reciprocating, as above described.

Figure 3:
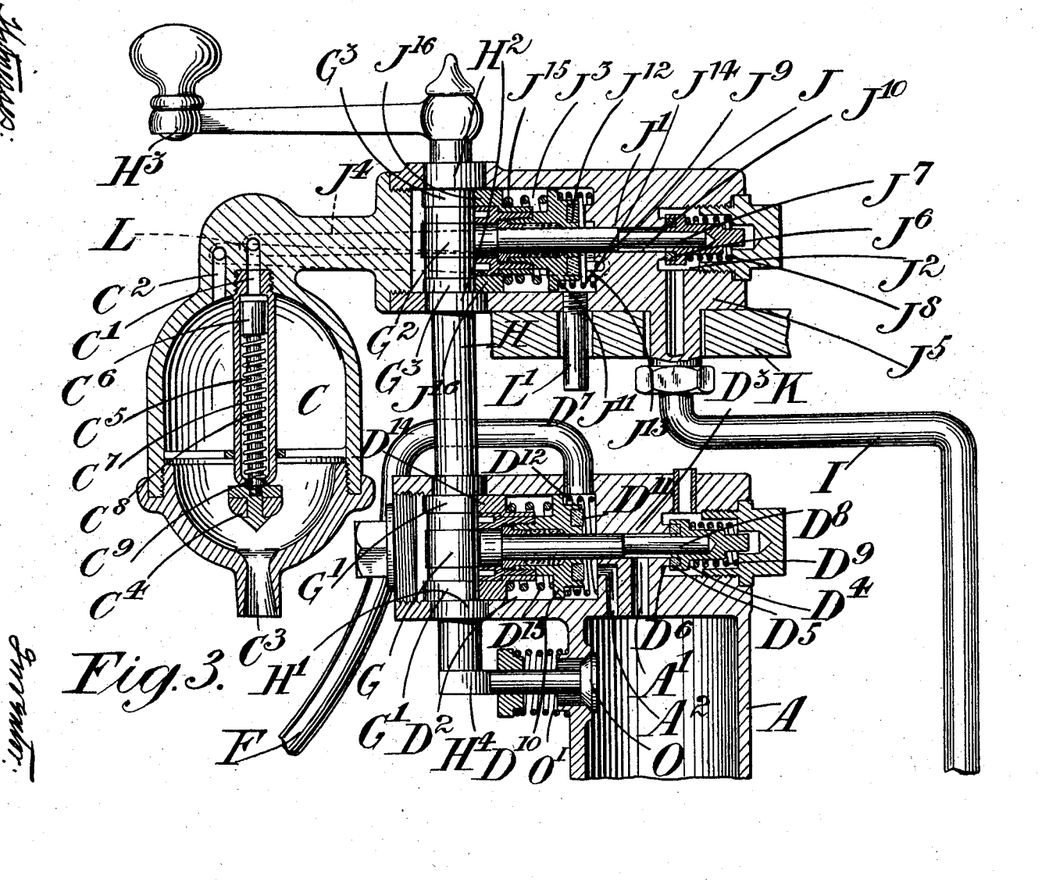
Fig. 3 is a sectional elevation of a modified construction of apparatus.

With the above-described apparatus the excess gas remaining in the filling-bottle after the mixture of gas and liquid has passed into the aerating-chamber is ultimately discharged into the atmosphere, and this loss is considerable, especially with large apparatus. In order to avoid the loss of gas, a convenient form of apparatus is shown in Fig. 3, in which the gas discharged from the filling-bottle is conveyed by the pipe F to a vessel M, placed intermediate of the filling-bottle and the water-supply pipe. The gas is thus employed to enrich the water before it enters the filling-bottle, and the vessel M may also be employed as a pressure-reducing vessel should the water-pressure in the supply-pipe be so great as to make it inconvenient for working purposes. The water-inlet to the vessel M is preferably controlled by a ball-cock or float-valve M', and the gas-pipe F from the filling-bottle enters near the bottom of the vessel and may be provided with a non-return valve. A relief-valve $M^2$ is connected to the intermediate vessel M and can be regulated by turning a screw-cap $M^3$ to compress or release the spring $M^4$ so that the pressure in the vessel cannot exceed a predetermined limit. Water is admitted to the vessel M up to a certain level and further supply is cut off by the valve M'. The air already in the vessel is compressed by the water and forces a sufficient quantity of it into the filling-bottle A, any excess of pressure escaping from the vessel by the valve $M^2$, so that the pressure in the filling-bottle A and in the vessel M is the same. This is the normal condition of the apparatus, and when it is desired to withdraw a quantity of aerated liquid the valve $D^4$ is operated in the manner already described, so that gas is admitted to the bottle A from a gas-container or other source of supply and forces the water from the filling-bottle into the aerating-chamber. The succeeding movement of the valve-operating mechanism opens the valve $J^5$ and permits the aerated liquid to enter the delivery vessel under the pressure of the gas in the aerating-chamber. Thereafter the valves $J^{11}$ and $J^{10}$ are opened, the opening of the valve $J^{11}$ permitting the excess gas in the delivery vessel to escape to the atmosphere and the liquid to be delivered through the opening $C^3$, the opening of the valve $D^{10}$ permitting the discharge of the excess gas in the filling-bottle into the intermediate vessel M, from which any excess of gas beyond the predetermined pressure escapes through the valve $M^2$. The filling-bottle and the vessel M are now at equal pressure, and in order that the gas-pressure in the vessel M may force the water into the filling-bottle A the pressure in the latter must be reduced below the pressure in the vessel M. In order to accomplish this, a gas-relief valve O is fitted to the filling-bottle and is operated against the action of a spring O' by a cam $H^4$ on the spindle H, which is operated at the necessary time to allow the gas in the vessel to escape to the atmosphere.

The cams for the valves $D^4$, $D^{10}$, $J^5$, $J^{11}$, and O are all carried by the spindle H, so that they can be operated by a single hand-lever arranged to move in one direction only to complete the cycle of operations. All these valves may be operated by any of the above-mentioned devices, permitting them to be controlled in a ready and effective manner.

Figure 4:
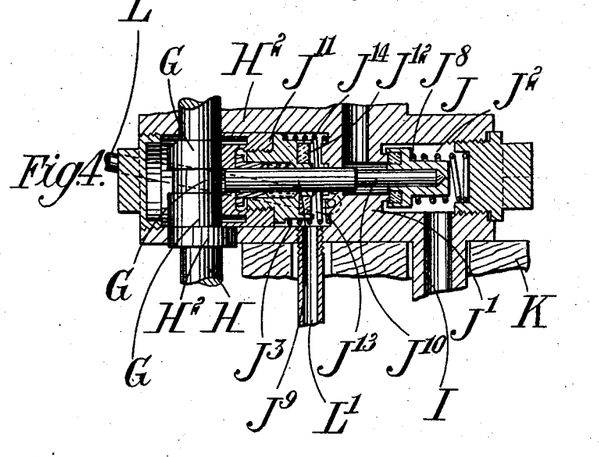
Fig. 4 is a longitudinal section of a modified form of valve.
Figure 5:
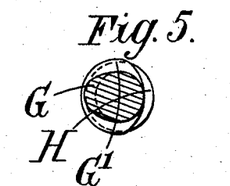
Fig. 5 is a sectional plan of the valve-operating cams.

In the modified construction of valve shown in Fig. 4 the cam, instead of acting on a sliding piston, such as above described, may act direct on the valve-piston $D^{10}$ or $J^{11}$, and instead of the valve-spindle being cut away to permit the passage of gas or liquid between the spindle and the walls of the opening the spindle may be of the same diameter throughout and the opening in the diaphragm increased in area at the requisite part.

The conduit or pipe L from the delivery vessel C, instead of opening into the chamber $J^3$, may be led into the chamber $D^2$, so that the valve $J^{11}$ may be dispensed with and the pressure in the vessel C and filling-bottle A and delivery vessel C reduced simultaneously by operating the valve $D^{10}$.

The apparatus above described is specially applicable for receiving the water-supply from the ordinary service-main or other water-pipe, so that a practically continuous supply of water is obtained; but it will be obvious that the water may be supplied equally well from other convenient source, whether under pressure or from a head sufficient to operate the non-return valve at the entrance to the filling-bottle A or the intermediate chamber M, as the case may be.

It is not intended to confine the invention to the form of apparatus nor to the precise arrangement of valve mechanism herein described, as it will be obvious that this may be varied in accordance with the requirements without departing from the essential nature of the invention.

What I claim as my invention, and desire to secure by Letters Patent, is—

1. In an apparatus for aerating liquids, the combination of a filling bottle or receiver into which gas and liquid are supplied from separate sources, an aerating chamber or reservoir into which the liquid and gas are forced by the pressure in the filling-bottle displacing an equal quantity of aerated liquid from the aerating-chamber, a delivery vessel into which the aerated liquid displaced from the reservoir passes and from which it is discharged after reduction of the pressure, valves controlling the separate supplies of gas and liquid to the receiver, the inlet of aerated liquid to the delivery vessel and the escape of gas from the receiver and delivery vessel and means for operating the valves substantially as described.

2. In an apparatus for aerating liquids, the combination of a filling bottle or receiver into which gas and liquids are supplied from separate sources, an aerating chamber or reservoir into which the liquid and gas are forced by the pressure in the filling-bottle displacing an equal quantity of aerated liquid from the aerating-chamber, a delivery vessel into which the aerated liquid displaced from the reservoir passes and from which it is discharged after reduction of the pressure, valves controlling the separate supplies of gas and liquid to the receiver, the inlet of aerated liquid to the delivery vessel, and the escape of gas from the receiver and delivery vessel, means for operating the valves, an automatically-operated check-valve between the receiver and aerating-chamber and a check-valve controlling the supply of liquid to the receiver, substantially as described.

3. In an apparatus for aerating liquids, the combination of a receiver into which gas and liquid are admitted from different sources, an aerating-chamber into which the liquid and gas are forced by the pressure in the receiver, displacing a quantity of aerating liquid therefrom, a delivery vessel into which the liquid displaced from the aerating-chamber passes, a gas-inlet valve on the receiver, a liquid-inlet valve on the delivery vessel, means for operating the gas and liquid inlet valves simultaneously, pressure-reducing valves on the receiver and delivery vessel and means for operating these valves subsequently to the gas and liquid inlet valves substantially as and for the purpose described.

4. In an apparatus for aerating liquids, the combination with a receiver into which gas and liquid are delivered from separate sources, an aerating-chamber in which the gas and liquid are forced by the pressure in the receiver displacing from the aerating-chamber a charge of aerated liquids, a delivery vessel of equal capacity to the receiver, a gas-inlet valve on the receiver, a liquid-inlet valve on the delivery vessel, a check-valve on the liquid-inlet on the receiver, a check-valve between the receiver and the aerating-chamber, means for operating the gas and liquid inlet valves on the receiver and delivery vessel and means for operating the pressure-reducing valves on the receiver and delivery vessels after the gas and aerating-liquid valves have been closed substantially as and for the purpose described.

5. In an apparatus for aerating liquids, the combination with a receiver, an aerating-chamber, and a delivery vessel, of a pressure-reducing valve on the receiver, a pressure-reducing valve on the delivery vessel, a spring-controlled check between the receiver and the aerating-chamber, means for operating the pressure-reducing valves, an outlet-valve on the delivery vessel adapted to be closed by the liquid, and opened by a spring on the reduction of pressure in the chamber substantially as and for the purpose described.

6. In an apparatus for aerating liquids, the combination with a receiver, an aerating-chamber and a delivery vessel, of a gas-inlet valve and a pressure-reducing valve on the receiver, a spring-controlled check-valve on the receiver, a spring-controlled check-valve between the receiver and the aerating-chamber, a liquid-inlet valve and a pressure-reducing valve on the delivery vessel, and means for operating the gas-inlet valve on the receiver and the liquid-inlet valve on the delivery vessel simultaneously, and also the pressure-reducing valve on the receiver and the delivery vessel simultaneously, substantially as and for the purpose described.

7. In an apparatus for aerating liquids, the combination with a receiver, an aerating-chamber and a delivery vessel of a gas-inlet valve on the receiver, an aerating liquid valve on the delivery vessel, pressure-reducing valves on the receiver and the delivery vessels, a check-valve between the receiver and the aerating-chamber opened by pressure and returned by a spring, cams for operating the gas-inlet valves on the receiver and the liquid-inlet valves on the delivery vessel simultaneously and the pressure-reducing valves simultaneously, substantially as described.

8. In an apparatus for aerating liquids, the combination with a receiver into which gas and liquids are admitted from separate sources and an aerating-chamber in which the gas and liquid are forced by the pressure in the receiver displacing a portion of aerating liquid, a gas-inlet valve and a liquid-inlet valve on the receiver, a pressure-reducing valve on the receiver, a check-valve between the receiver and the aerating-chamber, a valve controlling the outlet of liquid from the aerating-chamber, and means for operating the gas-inlet valve on the receiver, the liquid-outlet valve on the aerating-chamber and the pressure-reducing valves on the receiver substantially as and for the purpose described.

9. In an apparatus for aerating liquids the combination with a receiver, a valve-chamber divided into two compartments communicating with the receiver one of the compartments being in communication with the gas-supply and the other having a discharge-opening, of valves in the compartments successively operated to control the supply of gas to the receiver and the reduction of pressure therein, a water-inlet valve on the receiver adapted to be closed by the pressure therein and subsequently opened on reduction of that pressure by the inflowing liquid, and an aerated-liquid-discharge valve opened by the pressure in the receiver, substantially as described.

10. In an apparatus for aerating liquids, the combination with a receiver into which gas and liquids are delivered from separate sources and from which they are forced by the pressure into an aerating-chamber displacing therefrom a charge of aerated liquid, of a delivery vessel into which the liquid displaced from the aerating-chamber passes, a check-valve between the receiver and the aerating-chamber, a valve-chamber divided into two compartments, valves in the compartments successively operated to admit aerated liquid from the aerating-chamber, substantially as described.

11. In an apparatus for aerating liquids, the combination with a receiver into which gas and liquid are delivered from separate sources and from which they are forced by the pressure into an aerating-chamber displacing therefrom a charge of aerated liquid, of a delivery vessel, into which the liquid displaced from the aerating-chamber passes, a check-valve between the receiver and the aerating-chamber, a valve-chamber divided into two coaxial compartments communicating with the vessel one of them being also in communication with the aerating-chamber and the other having a discharge-opening, reciprocating valves in the compartments successively operated to admit aerated liquid to and reduce the pressure in the vessel, an outlet-valve having a spring-controlled stem and piston, and a guide-tube for the stem and piston into which the liquid entering the vessel has access substantially as and for the purpose described.

12. In an apparatus for aerating liquids, the combination with an aerating-chamber of a receiver into which liquid and gas are admitted from separate sources of coaxial valves successively operated to admit gas to the receiver and reduce the pressure therein, a liquid-inlet valve to the receiver closed by the pressure therein and subsequently opened by the inflowing liquid on reduction of that pressure, a liquid-discharge valve communicating with the aerating-chamber and adapted to be opened by the pressure in the receiver, a delivery vessel, a valve-chamber, coaxial valves in the chamber successively operated to admit aerated liquid to the vessel and reduce the pressure therein and a discharge-valve closed by the inrush of liquid to the vessel and opened by the subsequent reduction of pressure therein, substantially as described.

13. In an apparatus for aerating liquids, the combination with an aerating-chamber, of a receiver into which liquid and gas are admitted from separate sources, of coaxial valves successively operated to admit gas to the receiver and reduce the pressure therein, a liquid-inlet valve to the receiver, a liquid-discharge valve communicating with the aerating-chamber, a delivery vessel, a valve-chamber, coaxial valves in the chamber successively operated to admit aerated liquid to the vessel and reduce the pressure therein and an outlet-valve, substantially as described.

14. In an apparatus for aerating liquids, the combination with a receiver, an aerating-chamber and a delivery vessel, of a chamber into which the liquid to be aerated is first admitted and in which it is enriched by the gas discharged periodically from the main apparatus, gas and liquid inlet valves and a pressure-reducing valve on the receiver, a connection between the preliminary enriching-chamber and a liquid-inlet valve on the receiver, a conduit between the preliminary enriching-chamber and the pressure-reducing valve on the receiver, a relief-valve on the receiver and means for operating the apparatus substantially as and for the purpose described.

15. In apparatus for aerating liquids, the combination with a receiver, and an aerating-chamber, of a chamber into which the liquid to be aerated is first admitted and in which it is enriched by the excess gas discharged periodically from the main apparatus and forced by the gas-pressure into the receiver, a float-valve on the liquid-inlet to the preliminary enriching-chamber, a gas-inlet valve, and a pressure-reducing valve on the receiver, a conduit between the preliminary enriching-chamber and the pressure-reducing valve in the receiver, a gas-relief valve on the preliminary enriching-chamber, and means for operating the gas and liquid inlet valves and the pressure-reducing valves, successively, substantially as and for the purpose described.

16. In an apparatus for aerating liquids, the combination with a receiver, an aerating-chamber and a delivery vessel, of a preliminary enriching vessel, a liquid-inlet on the receiver, a check-valve on the inlet, a gas-inlet valve and a pressure-reducing valve on the receiver, a pressure-reducing and a liquid-inlet valve on the delivery vessel, a pipe between the pressure-reducing valve on the receiver and the preliminary enriching-chamber, a pipe between the preliminary enriching-chamber and the liquid-inlet on the receiver, a spring-controlled check-valve on the preliminary enriching-chamber, a relief-valve on the receiver, and a single operating device for the gas-relief and pressure-reducing valves on the receiver, the pressure-reducing valve and the liquid-inlet valve on the delivery vessel and the gas-inlet valve on the receiver substantially as and for the purpose described.

17. In apparatus for aerating liquids the combination with the filling-bottle of a valve-chamber divided into two compartments communicating with the bottle one of the chambers being in communication with the gas-supply and the other having a discharge-opening, of valves in the compartments successively operated to control the supply of gas to the bottle and the reduction of pressure therein, a water-inlet valve closed by the resultant pressure in the bottle and subsequently opened on the reduction of the pressure, and an aerated-liquid-discharge valve opened by the resultant pressure in the bottle substantially as described.

18. In apparatus for aerating liquids the combination with an aerating-chamber, of a filling-body into which liquid and gas are admitted from separate sources of coaxial valves successively operated to admit gas to the filling-bottle and reduce the pressure therein, a liquid-inlet valve to the filling-bottle closed by the resultant pressure in the bottle and subsequently opened on the reduction of the pressure, a liquid-discharge valve communicating with the aerating-chamber, opened by the resultant pressure in the bottle, a delivery vessel, a valve-chamber, coaxial valves in the chamber successively operated to admit aerated liquid to the vessel and reduce the pressure therein and an outlet-valve closed by the inrush of liquid to the vessel and opened by the subsequent reduction of pressure therein substantially as described.

19. In apparatus for aerating liquids the combination with an aerating-chamber of a filling-bottle into which liquid and gas are admitted from separate sources of coaxial valves successively operated to admit gas to the filling-bottle and reduce the pressure therein, a liquid-inlet valve to the filling-bottle, a liquid-discharge valve communicating with the aerating-chamber, a delivery vessel, a valve-chamber, coaxial valves in the chamber successively operated to admit aerated liquid to the vessel and reduce the pressure therein and an outlet-valve substantially as described.

In testimony whereof I have signed my name to this specification in the presence of two subscribing witnesses.

FRANK GEORGE HAMPSON.

Witnesses:
HAROLD WADE,
HARRY B. BRIDGE.